US011674498B1

(12) United States Patent
Evans et al.

(10) Patent No.: US 11,674,498 B1
(45) Date of Patent: Jun. 13, 2023

(54) SYSTEMS AND METHODS FOR CONTROLLING A WIND TURBINE

(71) Applicant: General Electric Renovables Espana, S.L., Barcelona (ES)

(72) Inventors: Scott Charles Evans, Burnt Hills, NY (US); Kasi Viswanadha Raju Gadiraju, Bengaluru (IN); Joseph Lawrence Chacon, Greenville, SC (US); Samuel Bryan Shartzer, Greenville, SC (US)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/725,974

(22) Filed: Apr. 21, 2022

(51) Int. Cl.
*F03D 7/02* (2006.01)
*F03D 7/04* (2006.01)

(52) U.S. Cl.
CPC .......... *F03D 7/0204* (2013.01); *F03D 7/045* (2013.01); *F03D 7/046* (2013.01); *F05B 2270/32* (2013.01); *F05B 2270/321* (2013.01); *F05B 2270/329* (2013.01); *F05B 2270/335* (2013.01); *F05B 2270/70* (2013.01)

(58) Field of Classification Search
CPC ........ F03D 7/2024; F03D 7/045; F03D 7/046; F05B 2270/32; F05B 2270/321; F05B 2270/329; F05B 2270/335; F05D 2270/70
See application file for complete search history.

(56) References Cited

U.S. PATENT DOCUMENTS

| 7,952,215 | B2 | 5/2011 | Hayashi et al. |
| 8,043,055 | B2 | 10/2011 | Matsuo et al. |
| 8,178,989 | B2 | 5/2012 | Haag et al. |
| 8,450,867 | B2 | 5/2013 | Fukami et al. |
| 8,476,780 | B2 | 7/2013 | Hashimoto et al. |
| 8,901,763 | B2 | 12/2014 | Bowyer et al. |
| 10,683,842 | B2 | 6/2020 | Chu et al. |
| 10,954,917 | B2 | 3/2021 | Oing et al. |
| 11,111,903 | B2 | 9/2021 | Goldner et al. |
| 11,421,660 | B2 * | 8/2022 | Li ...................... H04N 5/23296 |
| 2011/0206511 | A1 * | 8/2011 | Frydendal ............. F03D 7/0224 416/61 |
| 2014/0003939 | A1 * | 1/2014 | Adams .................. F03D 7/0224 416/1 |
| 2014/0356164 | A1 * | 12/2014 | Asheim .................... F03D 17/00 416/61 |
| 2015/0116131 | A1 * | 4/2015 | Ikeda ................. G05B 23/0235 340/870.07 |

(Continued)

FOREIGN PATENT DOCUMENTS

| EP | 2466125 A1 | 6/2012 |
| EP | 3760859 A1 | 1/2021 |
| EP | 3791062 A1 | 3/2021 |

*Primary Examiner* — Igor Kershteyn
(74) *Attorney, Agent, or Firm* — Dority & Manning, P.A.

(57) ABSTRACT

A system and method are provided for controlling a wind turbine of a wind farm. Accordingly, a controller prepares a yaw bias correction function based, at least in part, on a yaw offset function, and on wind speed measurement data and wind direction reference data of a wind event acting on at least a portion of the wind farm. The controller also applies the yaw bias correction function based at least in part on position data of a nacelle of the wind turbine, to yaw the nacelle of the wind turbine.

19 Claims, 9 Drawing Sheets

(56) References Cited

U.S. PATENT DOCUMENTS

| | | |
|---|---|---|
| 2016/0017866 A1* | 1/2016 | Craft .................... H04N 7/185 |
| | | 348/46 |
| 2018/0363625 A1 | 12/2018 | Nielsen |
| 2019/0024628 A1* | 1/2019 | De Barros ............ F03D 1/0633 |
| 2019/0072082 A1* | 3/2019 | Lysgaard .............. F03D 7/0204 |
| 2019/0153999 A1 | 5/2019 | Nielsen et al. |
| 2019/0170116 A1 | 6/2019 | Nielsen |
| 2019/0226457 A1* | 7/2019 | Bertolotti ................ F03D 17/00 |
| 2020/0032770 A1 | 1/2020 | Nielsen |
| 2020/0102932 A1 | 4/2020 | Hovgaard et al. |
| 2021/0071638 A1 | 3/2021 | Wei et al. |

* cited by examiner

SYSTEMS AND METHODS FOR CONTROLLING A WIND TURBINE

FIELD

The present disclosure relates in general to wind turbines and, more particularly, to systems and methods for controlling a wind turbine by applying a yaw bias correction based on wind speed and a yaw offset.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to a power grid.

Capturing the kinetic energy of the wind generally includes yawing the nacelle of the wind turbine into the wind. The wind turbine may produce a maximal amount of power for given environmental conditions when the nacelle and the wind are aligned in parallel. Accordingly, when the wind and the nacelle are misaligned so that the wind's vector intersects the axis of the nacelle, the power production of the wind turbine may be less than the maximal amount.

In order to facilitate the maximal power production of the wind turbine for a given environmental condition, wind turbines are typically equipped with meteorological and/or position localization sensors that perform, for example, geospatial orientation, wind direction, wind speed, temperature, barometric pressure, and/or air density measurements. This information may be utilized to adjust the yaw of the nacelle in order to bring the nacelle into alignment with the wind.

For example, individual wind turbines in a wind farm may use a compass, an absolute encoder, a wind vane, an anemometer (ultrasonic, for example), a real-time kinematic sensor, a LIDAR system, a meteorological mast or tower ("met mast") system, and/or an inertial navigation system to be aware of the actual direction in which their nacelles are facing (i.e., the angle of the nacelle with respect to true north) and to be aware of the error between the angle of their nacelles with respect to true north and/or the incoming wind direction. However, this information may lack the desired level of accuracy. Additionally, the wind vane or any other meteorological and/or position localization sensor (such as those listed above, or components thereof) may typically be mounted downwind of the rotor. Thus, the interaction of the rotor and the wind may induce a wind direction change downwind of the rotor. Accordingly, the wind vane or other sensor(s) may be transmitting biased measurement values as a sensor output. As such, the biased data may not result in the desired level of accuracy when controlling a wind turbine.

In view of the aforementioned, the art is continuously seeking new and improved systems and methods for controlling a wind turbine of a wind farm, especially, during a wind event.

BRIEF DESCRIPTION

Aspects and advantages of the disclosure will be set forth in part in the following description, or may be obvious from the description, or may be learned through practice of the disclosure.

In an aspect, the present disclosure is directed to a method for controlling a wind turbine that is part of a wind farm when a wind event is acting on the wind turbine. The wind farm having a plurality of wind turbines. The method includes preparing, via a controller, a yaw bias correction function based, at least in part, on a yaw offset function, and on wind speed measurement data and wind direction reference data of a wind event acting on at least a portion of the wind farm. The method also includes applying, via the controller, the yaw bias correction function based at least in part on position data of a nacelle of the wind turbine, to yaw the nacelle of the wind turbine.

In yet another aspect, the present disclosure is directed to a method for controlling a wind turbine when a current wind event is acting on the wind turbine. The method including receiving, at a controller, a yaw offset function based, at least in part, on wind direction data, and on position data from at least one wind turbine of the plurality of wind turbines. The method also including preparing, via a controller, a yaw bias correction function based, at least in part, on the yaw offset function, and on wind speed measurement data and wind direction reference data of a wind event acting on at least a portion of the wind farm. The method also including receiving, at the controller via one or more meteorological sensors, wind speed measurement data of the current wind event acting on the wind turbine of the plurality of wind turbines. The method also including receiving, at the controller via one or more position orientation sensors, position data of at least a nacelle of the wind turbine of the plurality of wind turbines, wherein the position data establishes a heading for the nacelle of the wind turbine during the current wind event. The method also including applying, via the controller, the yaw bias correction function using the position data and the heading of the nacelle of the wind turbine, and using the wind speed measurement data of the current wind event acting on the wind turbine, to correct a yaw offset signal used in controlling the wind turbine. The method also including controlling, via the controller with the corrected yaw offset signal, the wind turbine.

In yet another aspect, the present disclosure is directed to a method for controlling a wind turbine when a current wind event is acting on the wind turbine. The method including receiving, at a controller, a yaw offset function based, at least in part, on wind direction data, and on position data from at least one wind turbine of the plurality of wind turbines. The method also including receiving, at the controller via one or more meteorological sensors, wind speed measurement data of a wind event acting on at least a portion of the wind farm. The method also including receiving, via a standard reference, wind direction reference data of the wind event. The method also including determining, via the controller with the yaw offset function and a machine learning model, a yaw bias correction function using the wind speed measurement data and using the wind direction reference data of the wind event acting on the at least said portion of the wind farm. The method also including receiving, at the controller via one or more meteorological sensors, wind speed measurement data of the current wind event acting on the wind turbine of the plurality of wind turbines. The method also including receiving, at the controller via one or more position orientation sensors, position data of at least a nacelle of the wind turbine of the plurality of wind turbines, wherein the position data establishes a heading for the nacelle of the wind turbine during the current wind event. The method also including calculating, via the controller with the yaw offset function, the yaw offset for the nacelle of the wind turbine during the current wind event using the position data and the heading of the nacelle of the wind turbine. The method also including calculating, via the controller with the yaw bias correction function, the yaw bias correction for the calculated yaw offset using the wind speed measurement data of the current wind event acting on the wind turbine. The method also including correcting, via the controller with the yaw bias correction, the calculated yaw offset. The method also including controlling, via the controller with the corrected calculated yaw offset, the wind turbine.

These and other features, aspects, and advantages of the present disclosure will become better understood with reference to the following description and appended claims. The accompanying drawings, which are incorporated in and constitute a part of this specification, illustrate embodiments of the disclosure and, together with the description, explain the principles of the disclosure.

BRIEF DESCRIPTION OF THE DRAWINGS

A full and enabling disclosure of the present inventive concepts, including the best mode thereof, directed to one of ordinary skill in the art, is set forth in the specification, which makes reference to the appended figures, in which.

DETAILED DESCRIPTION

Figure 1:
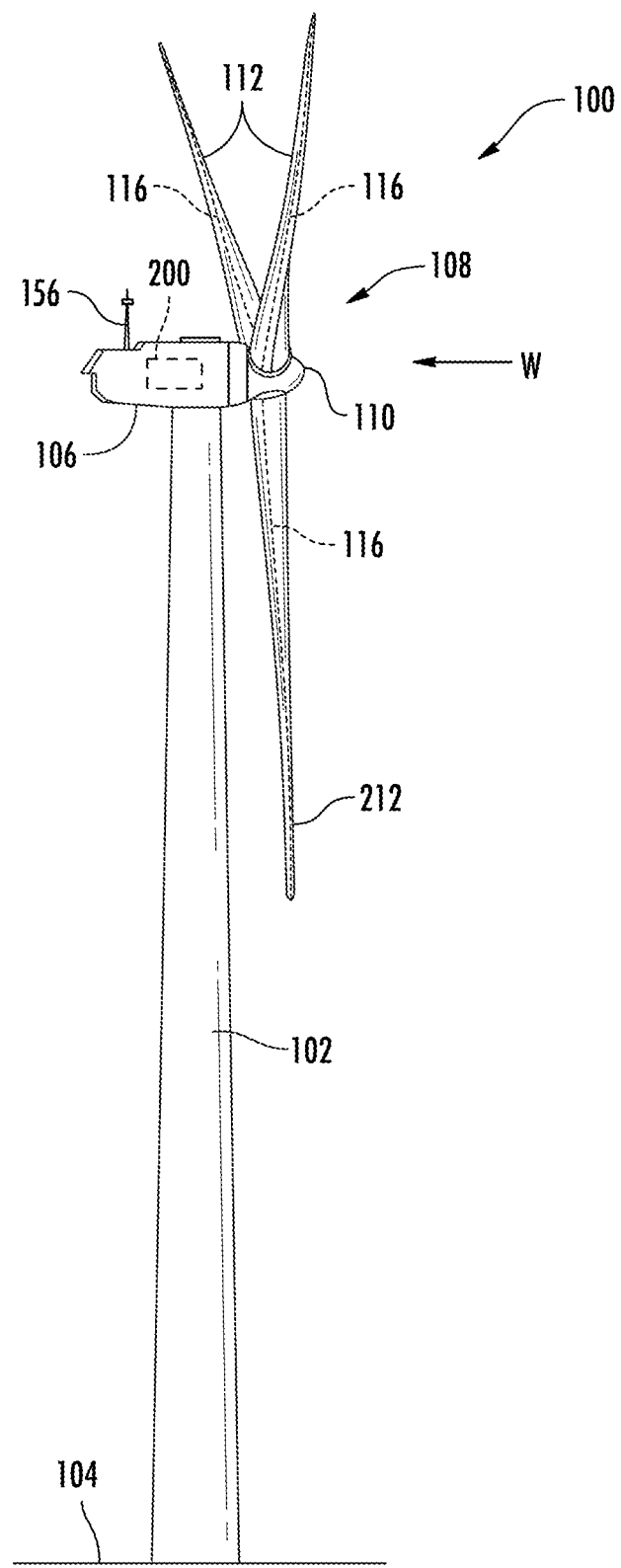
FIG. 1 illustrates a perspective view of an embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "coupled," "fixed," "attached to," and the like refer to both direct coupling, fixing, or attaching, as well as indirect coupling, fixing, or attaching through one or more intermediate components or features, unless otherwise specified herein. The terms "and" and "or" may be used herein together as "and/of" for simplified, clearer language (e.g., A, B, and/or C, instead of A, B, and C, and A, B, or C).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In order to efficiently produce electrical energy, it is desirable for the wind turbine nacelle to be placed in aerodynamic alignment with the direction of the winds acting on the wind turbine rotor blades. To properly align the rotor blades relative to the wind direction, a wind turbine commonly includes one or more yaw drive mechanisms configured to engage a yaw bearing for rotating the nacelle relative to the wind turbine tower. However, once aerodynamic alignment is assumed to have been achieved (i.e., calculated and/or processed by a wind turbine controller using conventional systems and methods, for example), additional rotation of the nacelle may be necessary to actually align the nacelle with the wind direction.

For example, horizontal-axis wind turbines, and in particular large on-shore and off-shore wind turbines, commonly include a plurality of yaw drive systems for rotating the nacelle and adjusting the turbine heading (also referred to as the "yaw angle" herein) in relation to continually changing micro- and macro-wind conditions (i.e., "dynamic wind directions" herein). Each yaw drive system usually is situated between the tower and the nacelle, and typically comprises one or more electric or hydraulic drives for rotating the yaw bearing, which is fully rotatable around an axis co-linear with the tower. In this way, the nacelle mounted on top of the bearing can be turned through 360.0 degrees in the horizontal plane.

Many different yaw drive systems are known in the art. A yaw drive system may have a number of components integrated partially in the nacelle and partially in the top of the tower, and the yaw drive system may work in tandem with various other systems and components of the wind turbine. For example, the overall system for controlling the wind turbine to which the yaw drive system may pertain may also comprise the yaw bearing, yaw brakes, a locking device, and a controller or controller system for a wind farm that is communicatively coupled to meteorological and/or position localization sensors and other related wind and geospatial data sources.

As a brief aside, "yaw error" or "yaw misalignment" are used herein to refer to the angular difference between the wind direction and the turbine heading, when aerodynamic alignment is assumed to have been achieved but where additional rotation of the nacelle is necessary to better align the turbine heading with the wind direction. When the yaw error/yaw misalignment is zero or substantially zero, or within and not exceeding a threshold, the nacelle is considered to actually be aligned with the wind direction. Often times, a "yaw offset" is needed to correct for the yaw misalignment.

With that context in mind, one purpose of the controller or control system of a wind turbine is to determine or implement the yaw offset needed to correct for the yaw misalignment, whilst ensuring that the thresholds, conditions, or circumstances indicative of or triggering a need for the yaw off are not overly broad or too sensitive. This helps avoid continuous, unnecessary, or insignificant implementation of yaw offsets that result in pre-mature wear of the mechanical components of the wind turbine.

To this end, various solutions have been developed with the intent of providing such a compromise. One solution has been developed, for example, comprising measuring and calculating a mean value of the wind direction using wind sensor data and then comparing the mean value with an ascertained turbine heading to determine the needed yaw offset. However, this solution type relies on accurate wind direction measurements, and this is not always possible in the field-wind turbines usually have wind direction measurements taken by wind vanes (or other meteorological and/or position localization sensors) positioned on the nacelle in a region where airflow is directly affected by the rotor blades. This is well known in the art and results in biased sensor data.

Other solutions have been developed with the intent of calculating and implementing yaw angle offset adjustments that do not suffer from the above deficiencies. More specifically, another solution has been developed, for example, comprising estimating an energy generation performance parameter for a subject wind turbine of a wind farm based on performance parameters of a designated subset of the wind turbines of the wind farm. The performance parameters are taken or determined at multiple sampling intervals during a yaw adjustment event beginning at a first yaw angle, for example. The estimated performance parameter may then be correlated with a monitored performance parameter for the subject wind turbine. Accordingly, a ratio of the monitored performance parameter to the estimated performance parameter may be calculated to determine a performance differential. Then, a trendline for the wind turbine correlating the performance differential to a deviation of a wind direction may be determined at each of the multiple sampling intervals for the yaw event.

For this solution, the two variable, 2-D trendline reflects variations in the ratio between the monitored performance and the estimated performance, based on the perceived wind direction. In particular, a vertex of the 2-D trendline may indicate a perceived wind direction at which the monitored performance parameter most closely coincides with the estimated performance parameter maxima. If the wind turbine is properly aligned to the wind direction, the vertex may occur at the first yaw angle. The vertex occurring at the first yaw angle may be due to the fact that the designated subset of wind turbines may maximize their respective performance parameters and, therefore, the estimated performance parameter when aligned with the wind at the yaw angle for the yaw event.

As such, for this solution, a vertex of the trendline which is offset from the first yaw angle indicates a misalignment of the wind turbine to the wind. In other words, the shifted vertex indicates that when the controller of the wind turbine perceives that the wind turbine is parallel to the wind, the wind turbine may actually be offset by a number of degrees from aerodynamic alignment with the wind, which may be the yaw angle at which optimal power may be produced. Therefore, when the wind is perceived to deviate from the reciprocal of the yaw angle, the wind may actually come into parallel alignment with the axis of the wind turbine. This results in the wind turbine having a performance parameter most closely correlated to the estimated performance parameter.

In this way, for this solution, the difference in degrees between the perceived wind angle associated with the vertex of the 2-D trend line and the first yaw angle represent the yaw angle offset and the yaw angle offset can be utilized to adjust the yaw angle of the wind turbine. This adjustment may occur, for example, when the wind turbine or its sensors are installed, maintained, or serviced. For example, the adjustment may include pre-emptively digitally biasing the sensor measurement of the installed anemometer or wind vane, or physically rotating and biasing the sensor to achieve the yaw angle offset determined using the 2-D trendline.

Although this solution does not necessarily suffer from the deficiencies in the art described above, it should also be appreciated that this solution has room for improvement. In particular, this solution relies on assumptions about energy production and about the amount of data-capture time that is needed to extrapolate trends, which may be incorrect, limited, or overly simplified. Moreover, this solution typically excludes wind speed measurement data and other relevant wind and meteorological data, as well as the ability to integrate other variables, commonly needed for accurate and precise wind direction forecasting.

Accordingly, the present disclosure provides many advantages not present in the art. Specifically, in one aspect, the present disclosure is directed to a system and method for controlling a wind turbine by implementing a yaw bias correction that is based on wind speed and a yaw offset. The yaw offset to be corrected by the yaw bias correction.

In an embodiment, controlling the wind turbine and implementing the yaw bias correction includes preparing a yaw bias correction function and applying, based at least in part on position data of a nacelle of the wind turbine, the yaw bias correction function to correct the yaw offset. The yaw bias correction function is itself based at least in part on the yaw offset function, and based at least in part on wind speed measurement data and wind direction reference data of a wind event acting on at least a portion of the wind farm.

In another embodiment, preparing the yaw bias correction function may happen in advance of applying the yaw bias correction or it may happen sequentially one after the other. The yaw bias correction function may be prepared remote to the wind turbine or the bias correction function may be prepared on or adjacent to the wind turbine. In particular, preparing the yaw bias correction function may involve leveraging a yaw offset function and, depending on the embodiment, the yaw offset function may be extrapolated, at least in part, using a variety of different methods such as the solutions described above.

For example, the yaw offset function may be extrapolated by measuring and calculating a mean value of the wind direction using wind sensor data and then comparing the mean value with an ascertained turbine heading to determine the yaw offset that is needed (described above). The yaw offset function also may be extrapolated, at least in part, by estimating an energy generation performance parameter for a subject wind turbine(s) of a wind farm based on performance parameters of a designated subset of the wind turbines of the wind farm (also described above) to determine the yaw offset that is needed to maximize the energy production. In particular, in an embodiment, the wind turbine includes and/or is configured as is described in U.S. patent application Ser. No. 17/027,789, filed Sep. 22, 2020, and titled Systems and Methods for Controlling a Wind Turbine, which is incorporated herein by reference in its entirety.

Regardless of the way the yaw offset function is derived, another aspect of the present disclosure is that a yaw bias correction function is prepared when a current wind event is acting on the wind turbine—the yaw bias correction function based at least in part on: (1) a yaw offset function based at least in part on wind direction data (e.g., data from past wind events or contemporaneous data from the current wind event), and on position data from at least one wind turbine of the plurality of wind turbines (e.g., data from past wind events or contemporaneous data from the current wind event); and on (2) wind speed measurement data of the current wind event acting on at least a portion of the wind farm.

In particular, in an embodiment, preparing the yaw bias correction function step comprises receiving a yaw offset function and receiving wind speed measurement data of the wind event (as distinguished from the "current wind event") acting on at least a portion of the wind farm. Preparing the yaw bias correction function also comprises receiving wind direction reference data of the wind event (again, as distinguished from the "current wind event") and determining, with the yaw offset function and a machine learning model, the yaw bias correction function using the wind speed measurement data and the wind direction reference data of the wind event acting on the portion wind farm.

Further, in another embodiment, applying the yaw bias correction function comprises receiving wind speed measurement data of the current wind event acting on the wind turbine of the plurality of wind turbines and receiving position data of at least a nacelle of the wind turbine of the plurality of wind turbines, wherein the position data establishes a heading for the nacelle of the wind turbine during the current wind event. Applying the yaw bias correction function also comprises calculating, with the yaw offset function, the yaw offset for the nacelle of the wind turbine during the current wind event using the position data and the heading of the nacelle of the wind turbine. Moreover, applying the yaw bias correction also comprises calculating, with the yaw bias correction function, the yaw bias correction for the calculated yaw offset using the wind speed measurement data of the current wind event acting on the wind turbine. Furthermore, applying the yaw bias correction function also comprises correcting the calculated yaw offset using the yaw bias correction and controlling the wind turbine using the corrected calculated yaw offset.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The wind turbine 100 may also include a controller 200 configured as a turbine controller centralized within the nacelle 106. However, in other embodiments, the controller 200 may be located within any other component of the wind turbine 100 or at a location outside the wind turbine. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer readable instructions that, when implemented, configure the controller 200 to perform various different functions, such as receiving, transmitting and/or executing wind turbine control signals.

Figure 2:
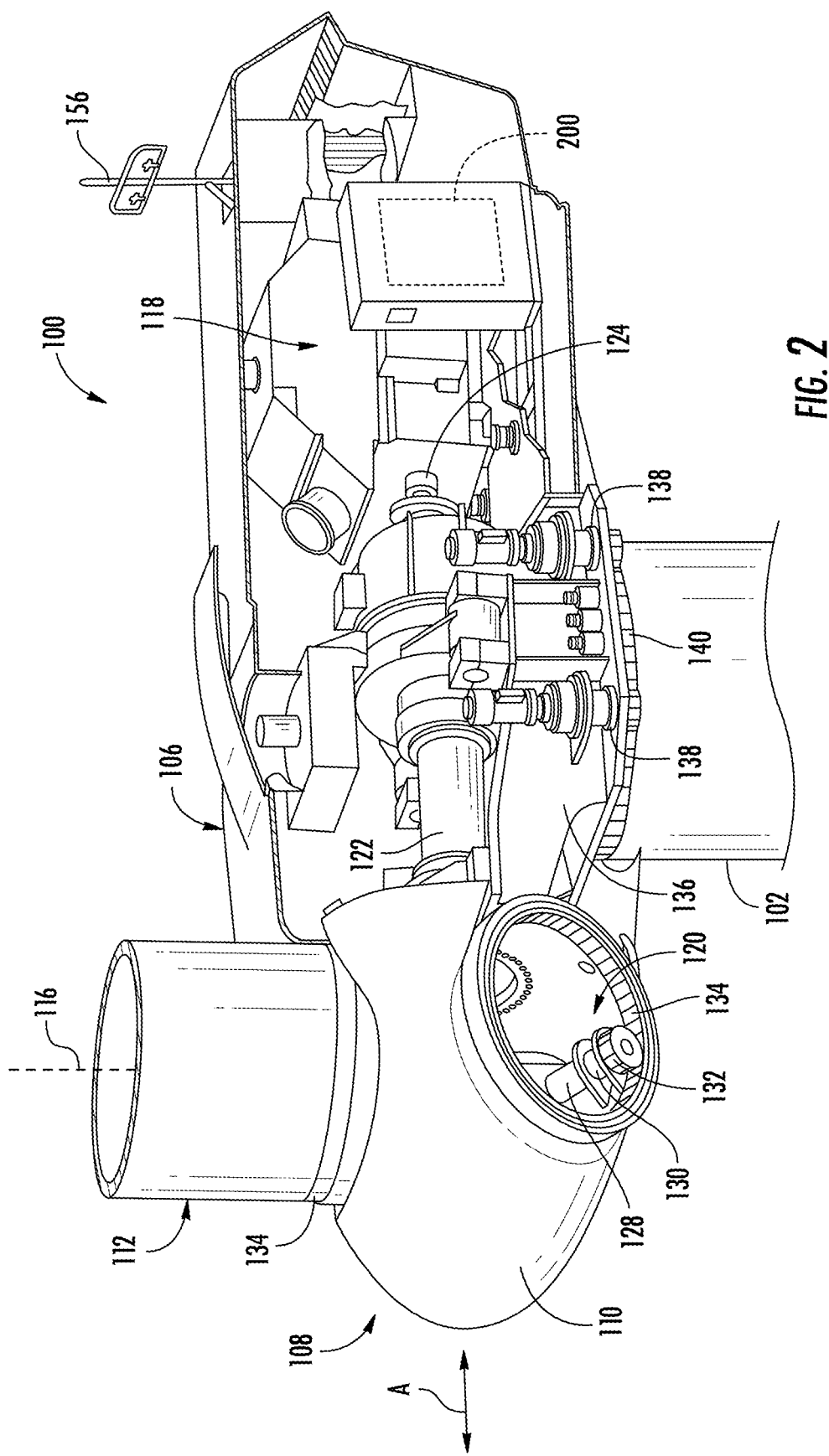
FIG. 2 illustrates a simplified, internal view of an embodiment of the nacelle of the wind turbine of FIG. 1.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through a gearbox 126 connected to a bedplate support frame 136. As is generally understood, the rotor shaft 122 may provide a low speed, high torque input to the gearbox 126 in response to rotation of the rotor blades 112 and the hub 110. The gearbox 126 may then be configured to convert the low speed, high torque input to a high speed, low torque output to drive the high-speed shaft 124 and, thus, the generator 118.

Each rotor blade 112 may also include a pitch control mechanism 120 configured to rotate each rotor blade 112 about its pitch axis 116. The pitch control mechanism 120 may include a pitch drive motor 128, a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116.

Similarly, the wind turbine 100 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 100). It should be appreciated that the controller 200 may direct the yawing of the nacelle 106 and/or the pitching of the rotor blades 112 so as to aerodynamically orient the wind turbine 100 relative to a wind (W) acting on the wind turbine 100, thereby facilitating power production.

Figure 3:
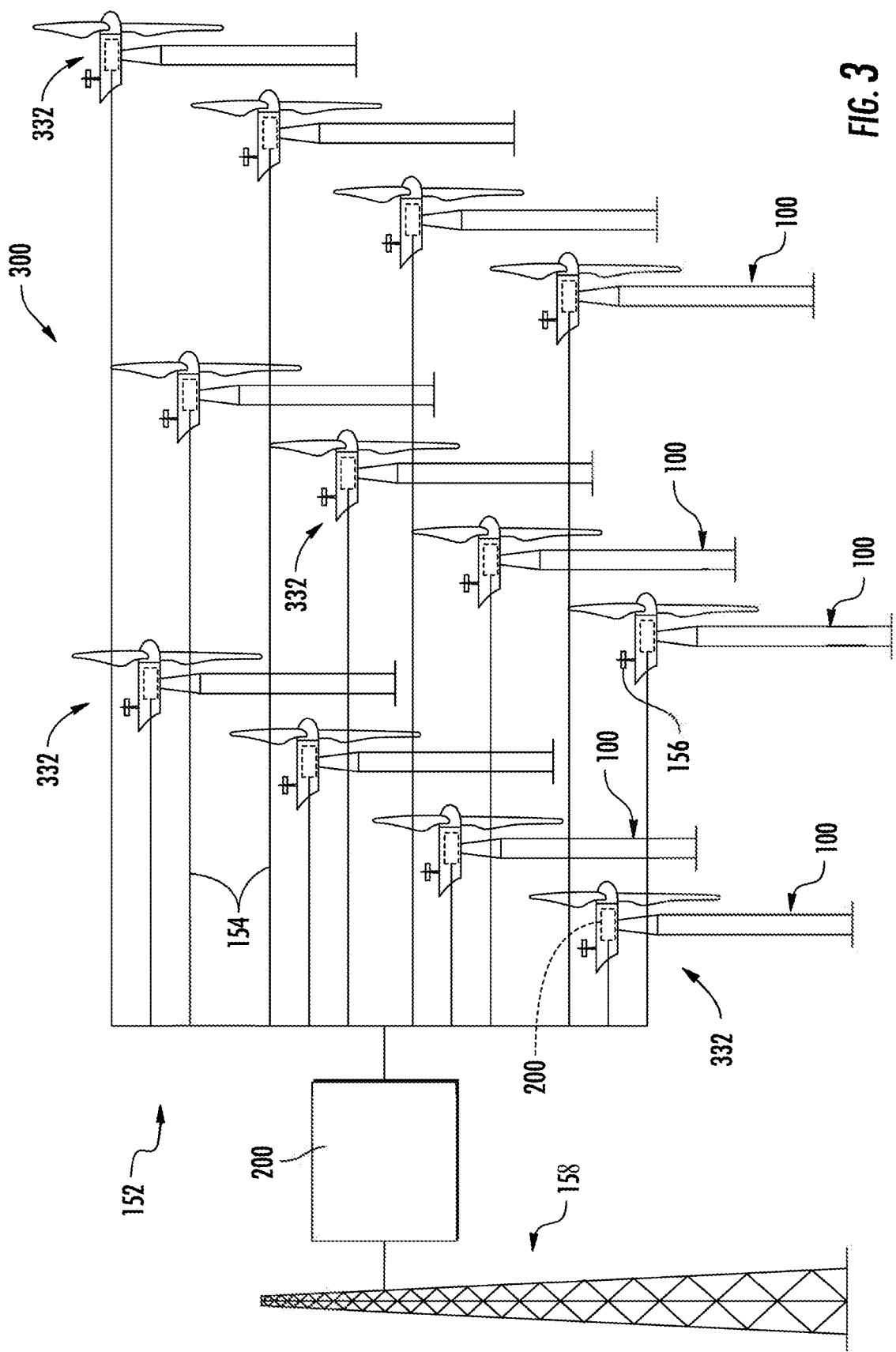
FIG. 3 illustrates a schematic diagram of one embodiment of a wind farm having a plurality of wind turbines according to the present disclosure

Referring now to FIG. 3, a schematic view of a wind farm 152 according to the present disclosure is illustrated. As shown, the wind from 152 may include a plurality of the wind turbines 100 described herein and the controller 200 configured as a farm controller. For example, as shown in the illustrated embodiment, the wind farm 152 may include twelve wind turbines 100. However, in other embodiments, the wind farm 152 may include any other number of wind turbines 100, such as less than twelve wind turbines 100 or greater than twelve wind turbines 100. In one embodiment, the controller(s) 200 may be communicatively coupled via a wired connection, such as by connecting the controller(s) through suitable communicative links 154 (e.g., a suitable cable). Alternatively, the controller(s) may be communicatively coupled through a wireless connection, such as by using any suitable wireless communications protocol known in the art.

In several embodiments, the wind farm 152 may include a plurality of environmental sensors 156 for monitoring a wind profile of the wind (W) affecting the wind farm 152, and thereby the wind turbines 100. The environmental sensor 156 may be configured for gathering data indicative of at least one environmental condition. The environmental sensor 156 may be operably coupled to the controller 200. Thus, in an embodiment, the environmental sensor(s) 156 may, for example, be a wind vane, an anemometer, a lidar sensor, thermometer, barometer, or other suitable meteorological and/or position localization sensor. The environmental sensor(s) 156 may be a component of a broader meteorological and/or position localization system that is remote to the wind turbine(s) 100 and/or part of the wind farm 152, such as a standard reference 158.

The data gathered by the environmental sensor(s) 156 may include measures of wind direction, wind speed, wind shear, wind gust, wind veer, atmospheric pressure, pressure gradient and/or temperature. In at least one embodiment, the environmental sensor(s) 156 may be mounted to the nacelle 106 at a location downwind of the rotor 108. It should be appreciated that the environmental sensor(s) 156 may include a network of sensors and may be positioned away from the turbine(s) 100. It should be appreciated that environmental conditions may vary significantly across a wind farm 152. Thus, the environmental sensor(s) 156 may allow for the local environmental conditions at each wind turbine 100 to be monitored individually by the respective turbine controllers and collectively by the farm controller. It also should be appreciated that the standard reference 158 may provide a prime standard of wing direction. Thus, the standard reference 158 may be configured as LIDAR, met mast, SONAR, nose cone anemometer, or other physical wind direction measurement system, and may be farm 152 level system.

Referring now to FIGS. 3-7, wherein various aspects of multiple embodiments of a system 300 for controlling the wind turbine 100 according to the present disclosure are presented. As shown particularly in FIG. 4, a schematic diagram of one embodiment of suitable components that may be included within the controller 200 is illustrated. Moreover, in certain embodiments, the controller 200 may be part of the wind turbine 100, such as within the nacelle 106 of the wind turbine 100 or in or around a base on the wind turbine 100 as well as in remote locations, distributed, and network-based or cloud-based. For example, as shown, the controller 200 may include one or more processor(s) 206 and associated memory device(s) 208 configured to perform a variety of computer-implemented functions (e.g., performing the methods, steps, calculations and the like and storing relevant data as disclosed herein). Additionally, the controller 200 may also include a communications module 210 to facilitate communications between the controller 200 and the wind turbines 100, and components thereof.

Figure 4:
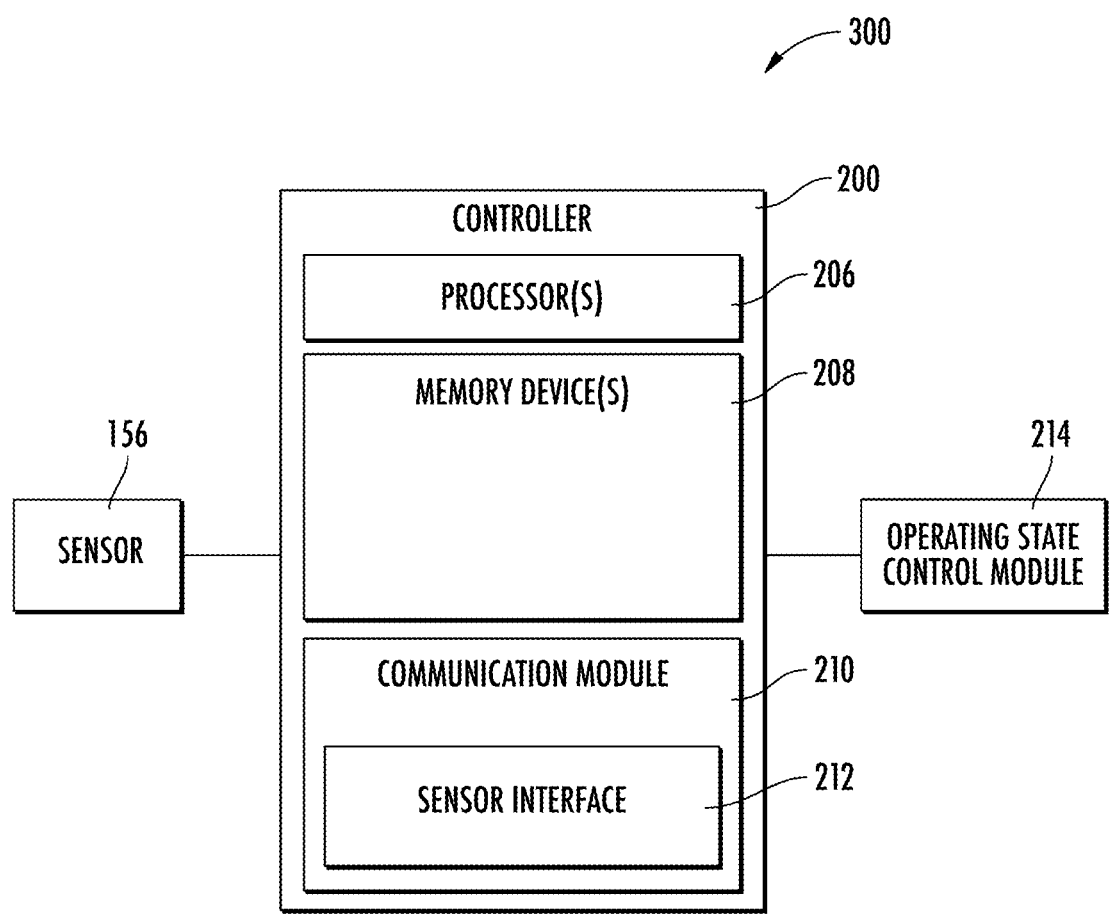
FIG. 4 illustrates a block diagram of an embodiment of suitable components that can be included within a controller of a system according to the present disclosure.

Further, the communications module 210 may include a sensor interface 212 (e.g., one or more analog-to-digital converters) to permit signals transmitted from any of the one or more of the different types of sensors of the wind turbine(s) of the wind farm 152, such as the environmental sensor(s) 156 to be converted into signals that can be understood and processed by the processors 206. It should be appreciated that the sensor(s) may be communicatively coupled to the communications module 210 using any suitable means. For example, as shown in FIG. 4, the sensors may be coupled to the sensor interface 212 via a wired connection. However, in other embodiments, the sensors may be coupled to the sensor interface 212 via a wireless connection, such as by using any suitable wireless communications protocol known in the art. Additionally, the communications module 210 may also be operably coupled to an operating state control module 214 configured to change at least one wind turbine operating state.

Figure 5:
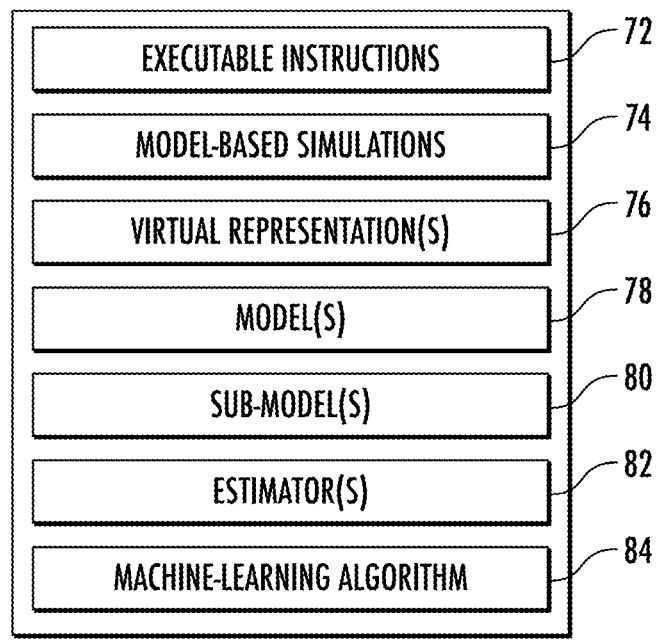
FIG. 5 illustrates a block diagram of an embodiment of suitable components that can be included within a processor of a controller of a system according to the present disclosure.

Moreover, as shown in FIG. 5, the processor(s) 206 of the controller 200 is configured to execute executable instructions 170 and run model-based simulations 174, virtual representation(s) 176, model(s) 178, sub-model(s) 180, and/or estimator(s) 182, to control the modules/interfaces of the controller 200, the wind turbine 100, and/or the wind farm 152 or any portion thereof. In addition, as shown, the processor(s) 206 may include one or more machine learning algorithms 184 programmed therein. Accordingly, various machine learning algorithms may be employed in the systems and methods of the present disclosure to iteratively refine the logic and/or the model-based simulations or estimators, virtual representations or simulations, models, sub-models, and/or estimators of the system 300 described herein, thereby increasing accuracy in the predictions that are based on such estimates and/or the high-frequency measurement data processing results. As such, in certain embodiments, the machine learning algorithm(s) 184 may receive feedback from the processor(s) 206 and train the feedback. Further, the machine learning algorithm(s) 184 may be a trained neural network, a simple linear regression model, a random forest regression model, a support vector machine, or any suitable type of a supervised learning model based on the quality and quantity of the data received. More specifically, in an embodiment, the system 300 may include an embedded reinforcement learning technique in the machine learning algorithm.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor(s) 126 may also be configured to compute advanced control algorithms and communicate to a variety of Ethernet or serial-based protocols (Modbus, OPC, CAN, etc.) as well as classical analog or digital signals. Additionally, the memory device(s) 64 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, transmitting suitable control signals to implement yaw angle adjustments to the nacelle of the wind turbine(s) 100 when applying a yaw bias correction as described herein, as well as various other suitable computer-implemented functions.

Figure 6:
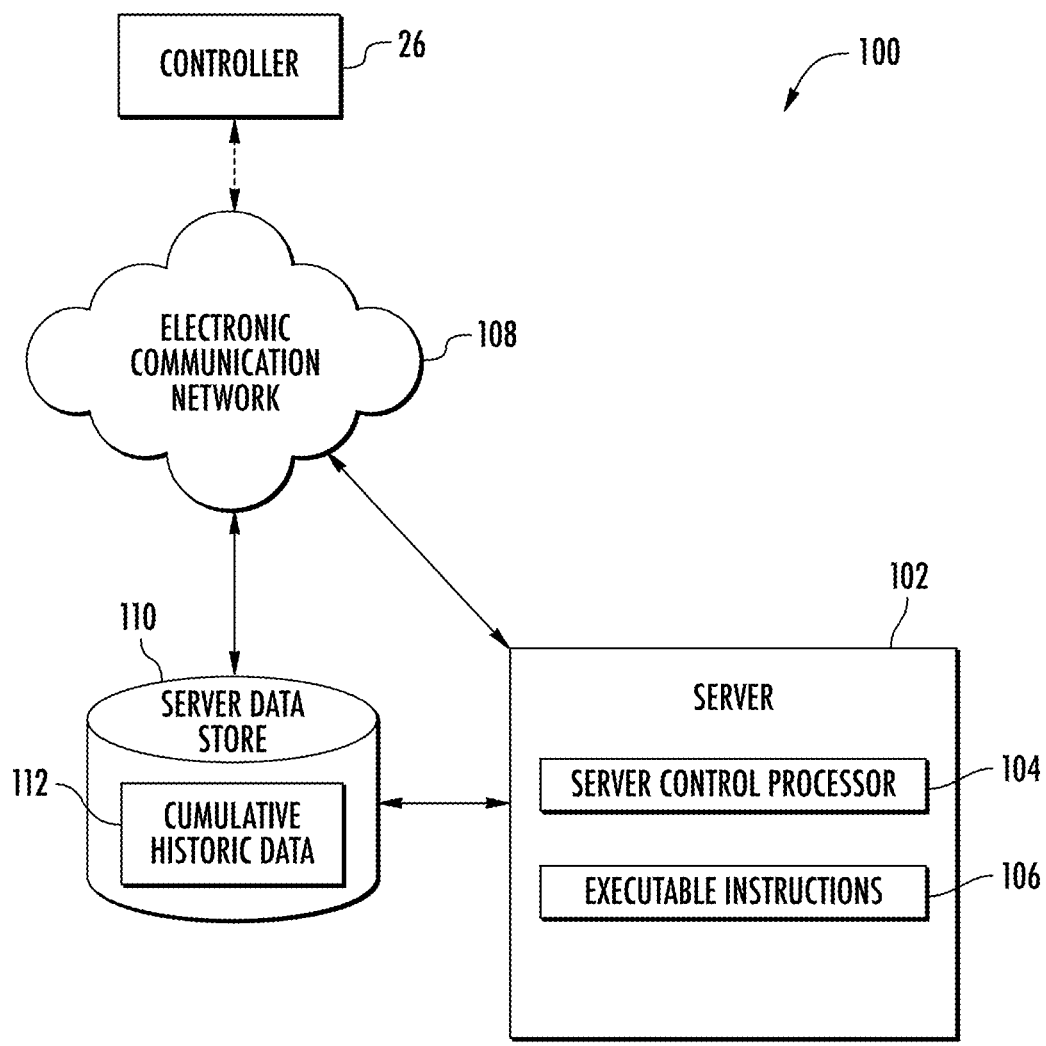
FIG. 6 illustrates a block diagram of an embodiment of a system for applying a yaw bias correction according to the present disclosure.

Referring now to FIG. 6, a block diagram of one embodiment of a system 300 for controlling a wind turbine, and for implementing a yaw bias correction based on wind speed and a yaw offset, in accordance with the aspects of the present disclosure is illustrated. As shown in FIGS. 3-6, the system 300 includes the controller 200, communications means 154, and sensors 156, and standard reference 158, as described herein. As shown in FIG. 6, the system 300 also includes a server 350 having a server control processor 352 with executable instructions 354 that facilitate communications with and between the processor(s) 206 of the controller 200. The server control processor 352 also may facilitate preparing a yaw bias correction function and transmitting the yaw bias correction function to the wind turbine(s) 100 of the wind farm 152, for example. Moreover, the server control processor 352 may facilitate remotely applying, based at least in part on position data of a nacelle of the wind turbine(s) 100, the yaw bias correction function to correct the yaw offset. Further, the server control processor 352 may facilitate preparing, storing, and/or transmitting a yaw off set function, or an extrapolated yaw off set signal, applicable to the wind turbine(s) 100 of the wind farm 152. This disclosure is not limited to any particular implementation in this regard.

In addition, as shown, the system 300 may further include an electronic communication network 358 for facilitating communications between the controller 200 and the server 350. Moreover, as shown, the system 300 may include a server data store 360 that may include cumulative historic data 362 containing records of prior accumulated data that can be used by the controller 200 and/or the server 350. This cumulative data may be organized by unique identifiers and heuristics. Thus, as shown, the controller 200, the server 350, and/or any other processor or interface/module of wind turbine 100 or any wind turbine of the wind farm 152 may access the cumulative historic data 362 for particular records.

The electronic communication network 358 may be, or may be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication means. It should be recognized that the systems and methods of the present disclosure are not limited by the nature of the network 358.

Thus, in an embodiment, the system 300 is configured to receive, access, or prepare a yaw offset function or yaw offset signal based, at least in part, on past or current wind direction data and on past or current position data from the sensor(s) 156 of the wind turbine(s) 100 of the wind farm 152. The system 300 also may receive past or current wind direction data and past or current position data from the sensor(s) 156 of the wind farm 152 that are remote to the wind turbine(s) 100. The system 300 also is configured to receive, via the sensor(s) 156 (meteorological sensors, for example), past or current wind speed measurement data of a wind event acting on at least a portion of the wind farm 152. Moreover, the system 300 is configured to receive, via the standard reference 158, past or current wind direction reference data.

Further, in an embodiment, the system 300, via the controller 200 and/or the server 350, is configured to determine, with the yaw offset function and a machine learning model, a yaw bias correction function using the past or current wind speed measurement data and using past or current wind direction reference data. Further, the system 300 is configured to receive, via the sensor(s) 156 (meteorological sensor and position orientation sensors, for example), current wind speed measurement data and current position data of at least a nacelle 106 of the wind turbine(s) 100 of the wind farm 152—to establish a current heading for the nacelle(s) of the wind turbine(s) 100. Further, the system 300 is configured to calculate, with the yaw offset function, the yaw offset for the nacelle(s) 106 of the wind turbine(s) 100 using the current position data and the current heading data. Further, the system 300 is configured to calculate, with the yaw bias correction function, the current yaw bias correction for the calculated yaw offset using the current wind speed measurement data. Further, the system 300 is configured to correct, with the yaw bias correction, the calculated yaw offset. Further, the system 300 is configured to control, with the corrected calculated yaw offset, the wind turbine using the yaw drive system 120, for example.

Figure 7:
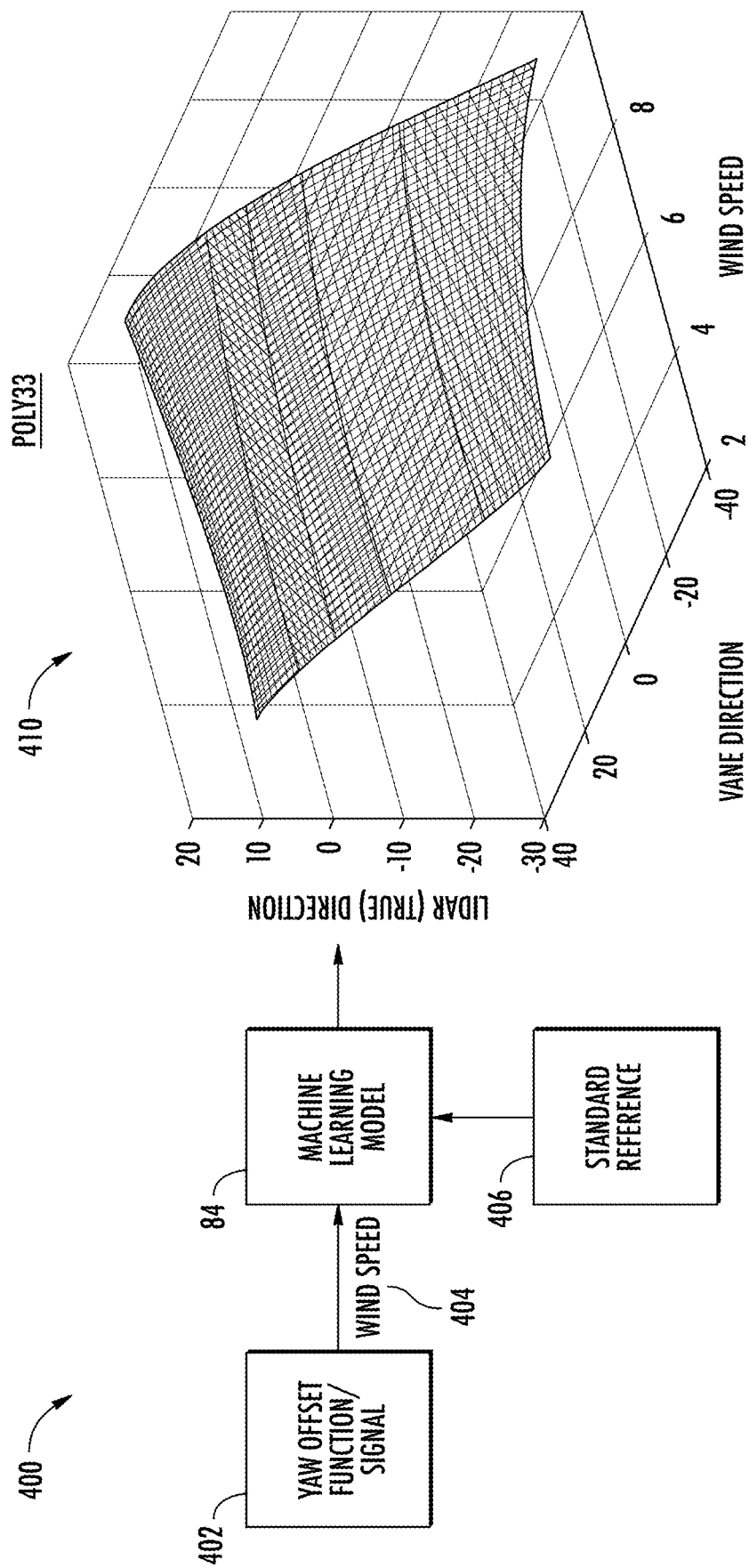
FIG. 7 illustrates a block diagram of an embodiment of a suitable control logic of a controller according to the present disclosure.

Referring now to FIG. 7, a block diagram of an embodiment of a suitable control logic 400 of the controller 200 for controlling a wind turbine, and for implementing a yaw bias correction is illustrated. In particular, the processor(s) 206 of the controller 200 are configured to run the control logic 400 to prepare a yaw bias correction function based, at least in part, on a yaw offset signal from a wind turbine (or on a yaw offset function for a wind turbine(s) of a wind farm), and on wind speed measurement data and wind direction reference data of a wind event acting on at least a portion of the wind farm. Inputs for the control logic 400 include a yaw offset signal 402 (or a yaw offset function 402 applicable to the wind turbine(s) for determining the yaw offset), wind speed measurement data 404, and wind direction standard reference data 406. Thus, the machine learning model 84 of the processor(s) 206 facilitates processing the input data. For example, as shown, the machine learning model 84 leverages the yaw offset signal 402 (or the yaw offset function 402) to process the various categories of inputs to yield, as an output 410, a polynomial function for yaw bias correction. The yaw bias correction function 410 comprises a poly11 linear polynomial surface model and a poly33 cubic surface model at any given wind speed, standard reference direction, and turbine heading.

Figure 8:
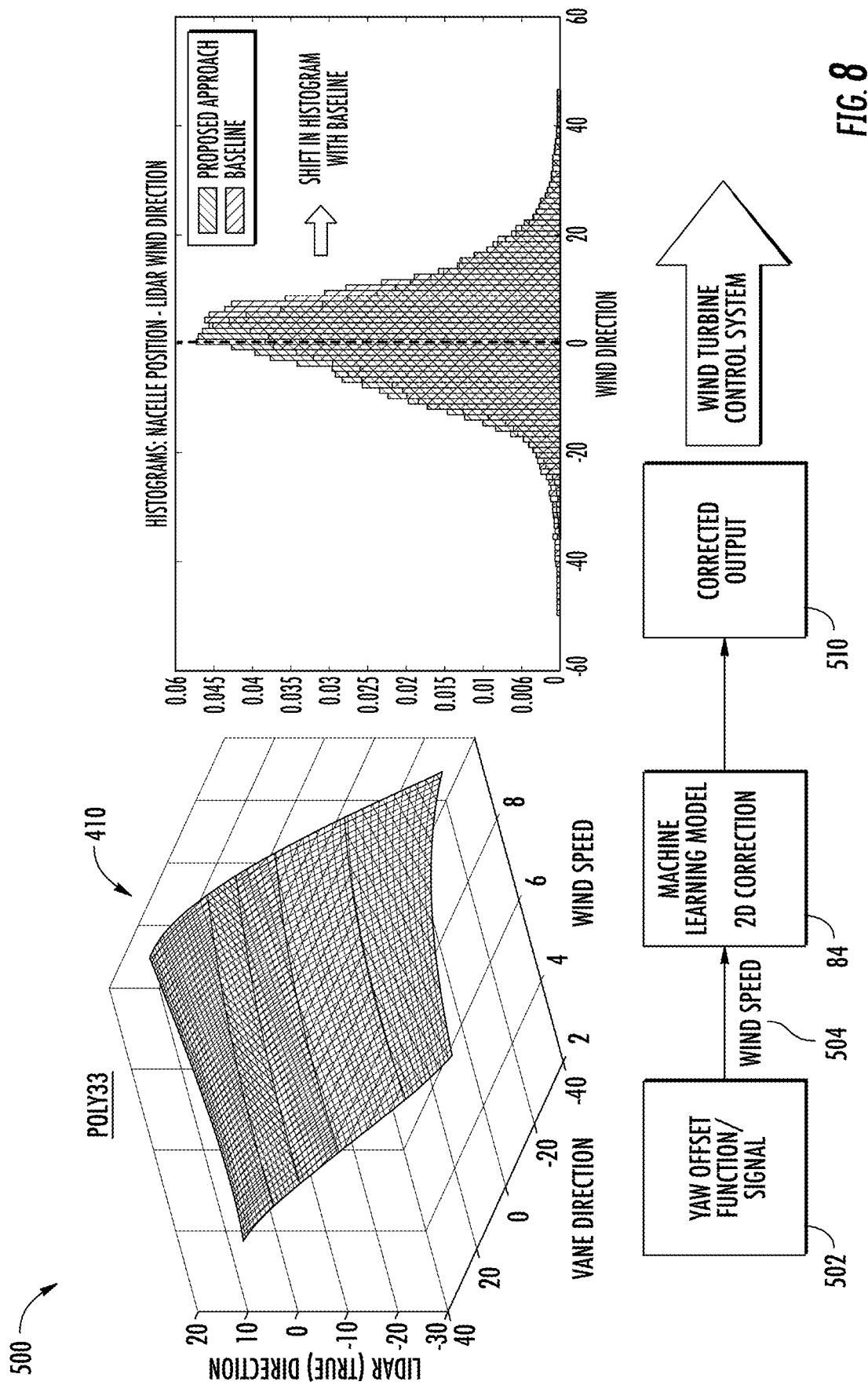
FIG. 8 illustrates a block diagram of another embodiment of a suitable control logic of a controller according to the present disclosure.

Referring now to FIG. 8, a block diagram of an embodiment of a suitable control logic 500 of the controller 200 for controlling a wind turbine, and for implementing a yaw bias correction is illustrated. In particular, the processor(s) 206 of the controller 200 are configured to run the control logic 500 to apply a yaw bias correction function to correct a yaw offset and, therefore, to adjust the turbine heading. As shown in FIG. 7, the machine learning model 84 of control logic 400 may yield outputs that operate as inputs for the control logic 500. Specifically, inputs for the control logic 500 include a yaw bias correction function 410 (from control logic 400, for example, or from another controller and based on past or current data about a wind event), and a current yaw offset signal 502 for a wind turbine(s) (or a yaw offset function 502 applicable to the wind turbine(s)), and current wind speed measurement data 504. Thus, the machine learning model 84 of the processor(s) 206 facilitates processing the input data. For example, as shown, the processor(s) 206 leverages the yaw bias correction function 410 to process the various categories of inputs, to correct the yaw offset signal 402 based on the current wind speed measurement data 504. As such, the processor(s) 206 leverage and process the various categories of inputs to yield, as an output 510, a corrected turbine heading to be used for controlling the wind turbine(s) during the current wind event. Optional inputs for the control logic 500 include rotor blade pitch angle measurements and tip-speed ratio data, which may be used as inputs for the yaw offset signal/ function 502, for example, or for a different more than three-dimensional yaw bias correction function 410.

It should also be appreciated that FIGS. 1-8 are provided for illustrative purposes, and to place the present subject matter in an exemplary field of use. A person having ordinary skill in the art readily appreciates that the present disclosure is not limited to any one type of configuration.

Figure 9:
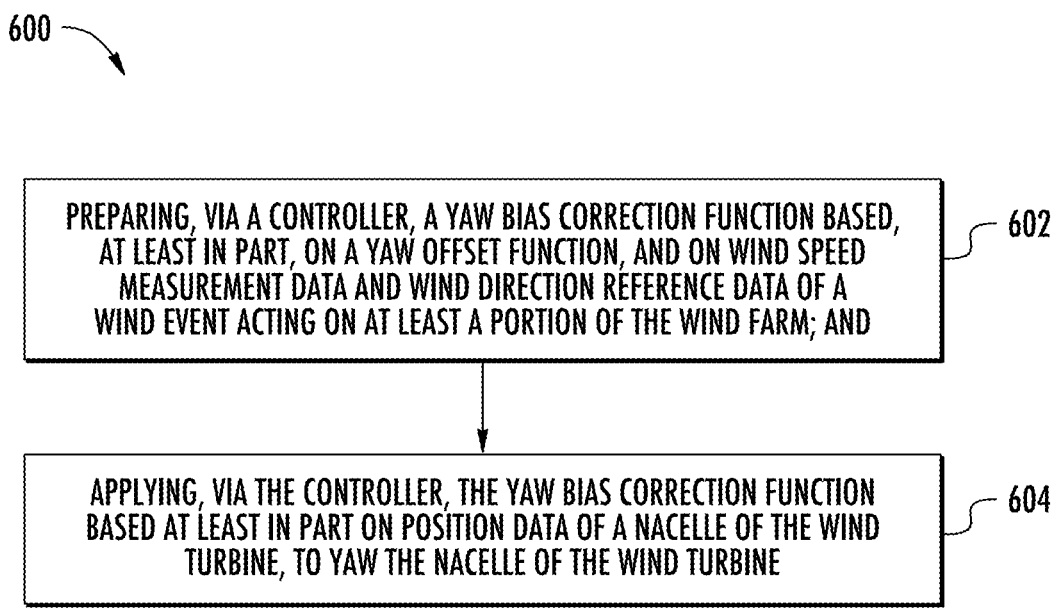
FIG. 9 illustrates a flow diagram of an embodiment of a method for applying a yaw bias correction according to the present disclosure.

Referring now to FIG. 9, a flow diagram of an embodiment of a method 600 for controlling a wind turbine when a wind event is acting on a wind turbine, in accordance with the aspects of the present disclosure is illustrated. The method 600 may be implemented using the systems 300 discussed herein with references to FIGS. 1-8. FIG. 9 depicts steps performed in a particular order for purposes of illustration and discussion. Those of ordinary skill in the art, using the disclosures provided herein, will understand that various steps of the method 600 or any of the other methods disclosed herein may be adapted, modified, rearranged, performed simultaneously, or modified in various ways without deviating from the scope of the present disclosure.

As shown at (602), the method includes preparing, via a controller, a yaw bias correction function based, at least in part, on a yaw offset function, and on wind speed measurement data and wind direction reference data of a wind event acting on at least a portion of the wind farm. As shown at (604), the method includes applying, via the controller, the yaw bias correction function based at least in part on position data of a nacelle of the wind turbine, to yaw the nacelle of the wind turbine.

This written description uses examples to disclose the disclosure, including the best mode, and to enable any person skilled in the art to practice the disclosure, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the disclosure is by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

What is claimed is:

1. A method for controlling a wind turbine when a wind event is acting on the wind turbine, the wind turbine part of a wind farm having a plurality of wind turbines, the method comprising:

preparing, via a controller, a yaw bias correction function based, at least in part, on a yaw offset function, and on wind speed measurement data and wind direction reference data of a wind event acting on at least a portion of the wind farm; and applying, via the controller, the yaw bias correction function based at least in part on position data of a nacelle of the wind turbine, to yaw the nacelle of the wind turbine.

2. The method of claim 1, the method further comprising receiving, at a controller, the yaw offset function based, at least in part, on wind direction data, and on position data from at least one wind turbine of the plurality of wind turbines.

3. The method of claim 1, the method further comprising receiving, at the controller via one or more meteorological sensors, wind speed measurement data of the wind event acting on the wind turbine of the plurality of wind turbines.

4. The method of claim 1, the method further comprising receiving, at the controller via one or more position orientation sensors, position data of at least a nacelle of the wind turbine of the plurality of wind turbines, wherein the position data establishes a heading for the nacelle of the wind turbine during the wind event.

5. The method of claim 1, the method further comprising controlling, via the controller with the corrected yaw offset signal, the wind turbine.

6. The method of claim 1, wherein preparing the yaw bias correction function comprises receiving, via a standard reference, wind direction reference data of the wind event.

7. The method of claim 6, wherein preparing the yaw bias correction function further comprises determining, via the controller with the yaw offset function and a machine learning model, a yaw bias correction function using the wind speed measurement data and using the wind direction reference data of the wind event acting on the at least said portion of the wind farm.

8. The method of claim 1, wherein applying the yaw bias correction function to correct a yaw offset signal used in controlling the wind turbine comprises calculating, via the controller with the yaw offset function, the yaw offset for the nacelle of the wind turbine during the current wind event using the position data and the heading of the nacelle of the wind turbine.

9. The method of claim 8, wherein applying the yaw bias correction function to correct a yaw offset signal used in controlling the wind turbine further comprises calculating, via the controller with the yaw bias correction function, the yaw bias correction for the calculated yaw offset using the wind speed measurement data of the current wind event acting on the wind turbine.

10. The method of claim 9, wherein applying the yaw bias correction function to correct a yaw offset signal used in controlling the wind turbine further comprises correcting, via the controller with the yaw bias correction, the calculated yaw offset.

11. A method for controlling a wind turbine when a current wind event is acting on the wind turbine, the wind turbine part of a wind farm having a plurality of wind turbines, the method comprising:

receiving, at a controller, a yaw offset function based, at least in part, on wind direction data, and on position data from at least one wind turbine of the plurality of wind turbines;

preparing, via the controller, a yaw bias correction function based, at least in part, on the yaw offset function, and on wind speed measurement data and wind direction reference data of a wind event acting on at least a portion of the wind farm;

receiving, at the controller via one or more meteorological sensors, wind speed measurement data of the current wind event acting on the wind turbine of the plurality of wind turbines;

receiving, at the controller via one or more position orientation sensors, position data of at least a nacelle of the wind turbine of the plurality of wind turbines, wherein the position data establishes a heading for the nacelle of the wind turbine during the current wind event;

applying, via the controller, the yaw bias correction function using the position data and the heading of the nacelle of the wind turbine, and using the wind speed measurement data of the current wind event acting on the wind turbine, to correct a yaw offset signal used in controlling the wind turbine; and controlling, via the controller with the corrected yaw offset signal, the wind turbine.

12. The method of claim 11, wherein preparing the yaw bias correction function comprises receiving, via a standard reference, wind direction reference data of the wind event.

13. The method of claim 12, wherein preparing the yaw bias correction function further comprises determining, via the controller with the yaw offset function and a machine learning model, a yaw bias correction function using the wind speed measurement data and using the wind direction reference data of the wind event acting on the at least said portion of the wind farm.

14. The method of claim 11, wherein applying the yaw bias correction function to correct a yaw offset signal used in controlling the wind turbine comprises calculating, via the controller with the yaw offset function, the yaw offset for the nacelle of the wind turbine during the current wind event using the position data and the heading of the nacelle of the wind turbine.

15. The method of claim 14, wherein applying the yaw bias correction function to correct a yaw offset signal used in controlling the wind turbine further comprises calculating, via the controller with the yaw bias correction function, the yaw bias correction for the calculated yaw offset using the wind speed measurement data of the current wind event acting on the wind turbine.

16. The method of claim 15, wherein applying the yaw bias correction function to correct a yaw offset signal used in controlling the wind turbine further comprises correcting, via the controller with the yaw bias correction, the calculated yaw offset.

17. A method for controlling a wind turbine when a current wind event is acting on the wind turbine, the wind turbine part of a wind farm having a plurality of wind turbines, the method comprising:

receiving, at a controller, a yaw offset function based, at least in part, on wind direction data, and on position data from at least one wind turbine of the plurality of wind turbines;

receiving, at the controller via one or more meteorological sensors, wind speed measurement data of a wind event acting on at least a portion of the wind farm;

receiving, via a standard reference, wind direction reference data of the wind event;

determining, via the controller with the yaw offset function and a machine learning model, a yaw bias correction function using the wind speed measurement data and using the wind direction reference data of the wind event acting on the at least said portion of the wind farm; and receiving, at the controller via one or more meteorological sensors, wind speed measurement data of the current wind event acting on the wind turbine of the plurality of wind turbines;

receiving, at the controller via one or more position orientation sensors, position data of at least a nacelle of the wind turbine of the plurality of wind turbines, wherein the position data establishes a heading for the nacelle of the wind turbine during the current wind event;

calculating, via the controller with the yaw offset function, the yaw offset for the nacelle of the wind turbine during the current wind event using the position data and the heading of the nacelle of the wind turbine;

calculating, via the controller with the yaw bias correction function, the yaw bias correction for the calculated yaw offset using the wind speed measurement data of the current wind event acting on the wind turbine;

correcting, via the controller with the yaw bias correction, the calculated yaw offset; and controlling, via the controller with the corrected calculated yaw offset, the wind turbine.

18. The method of claim 17, wherein the yaw offset function is based, at least in part, on a mean value of wind direction data from each of the wind turbines of the plurality of wind turbines, and a comparison of the mean value with an ascertained turbine heading for at least one wind turbine of the plurality of wind turbines to determine the yaw offset at different wind directions.

19. The method of claim 17, wherein the yaw offset function is extrapolated, at least in part, by estimating an energy generation performance parameter for at least one wind turbine of the plurality of wind turbines based on performance parameters of a designated subset of wind turbines of the plurality of wind turbines to determine the yaw offset that is needed to maximize energy production from the plurality of wind turbines.

* * * * *